United States Patent
Kurosu et al.

(10) Patent No.: US 12,410,335 B2
(45) Date of Patent: Sep. 9, 2025

(54) METHOD FOR PRODUCING INK FOR USE IN FORMING ELECTROLYTE LAYER OF FUEL CELL

(71) Applicant: HONDA MOTOR CO., LTD., Tokyo (JP)

(72) Inventors: Fumiyoshi Kurosu, Saitama (JP); Naoki Kushitani, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/010,180

(22) Filed: Jan. 6, 2025

(65) Prior Publication Data

US 2025/0230330 A1    Jul. 17, 2025

(30) Foreign Application Priority Data

Jan. 17, 2024   (JP) ................ 2024-005152

(51) Int. Cl.
*C09D 11/52* (2014.01)
*H01M 8/126* (2016.01)

(52) U.S. Cl.
CPC ............ *C09D 11/52* (2013.01); *H01M 8/126* (2013.01)

(58) Field of Classification Search
CPC ........................................ C09D 11/52
See application file for complete search history.

(56) References Cited

U.S. PATENT DOCUMENTS

| 2007/0048205 A1* | 3/2007 | Katusic | B82Y 30/00 423/263 |
| 2020/0203748 A1* | 6/2020 | Aikawa | C04B 35/486 |

FOREIGN PATENT DOCUMENTS

JP       2020064721 A    4/2020

* cited by examiner

*Primary Examiner* — William D Young
(74) *Attorney, Agent, or Firm* — CKC & Partners Co., LLC

(57) ABSTRACT

A method for producing an ink for use in forming an electrolyte layer of a fuel cell according to an embodiment of the present invention includes: a crushing step of crushing a cerium-containing oxide powder to obtain a cerium-containing oxide fine powder; a first mixing step of mixing and stirring the cerium-containing oxide fine powder, an ionomer, and water to obtain a first mixed liquid; a second mixing step of mixing and stirring the first mixed liquid and 1-propanol to obtain a second mixed liquid; and an ultrasonic treatment step of performing an ultrasonic treatment on the second mixed liquid.

4 Claims, 1 Drawing Sheet

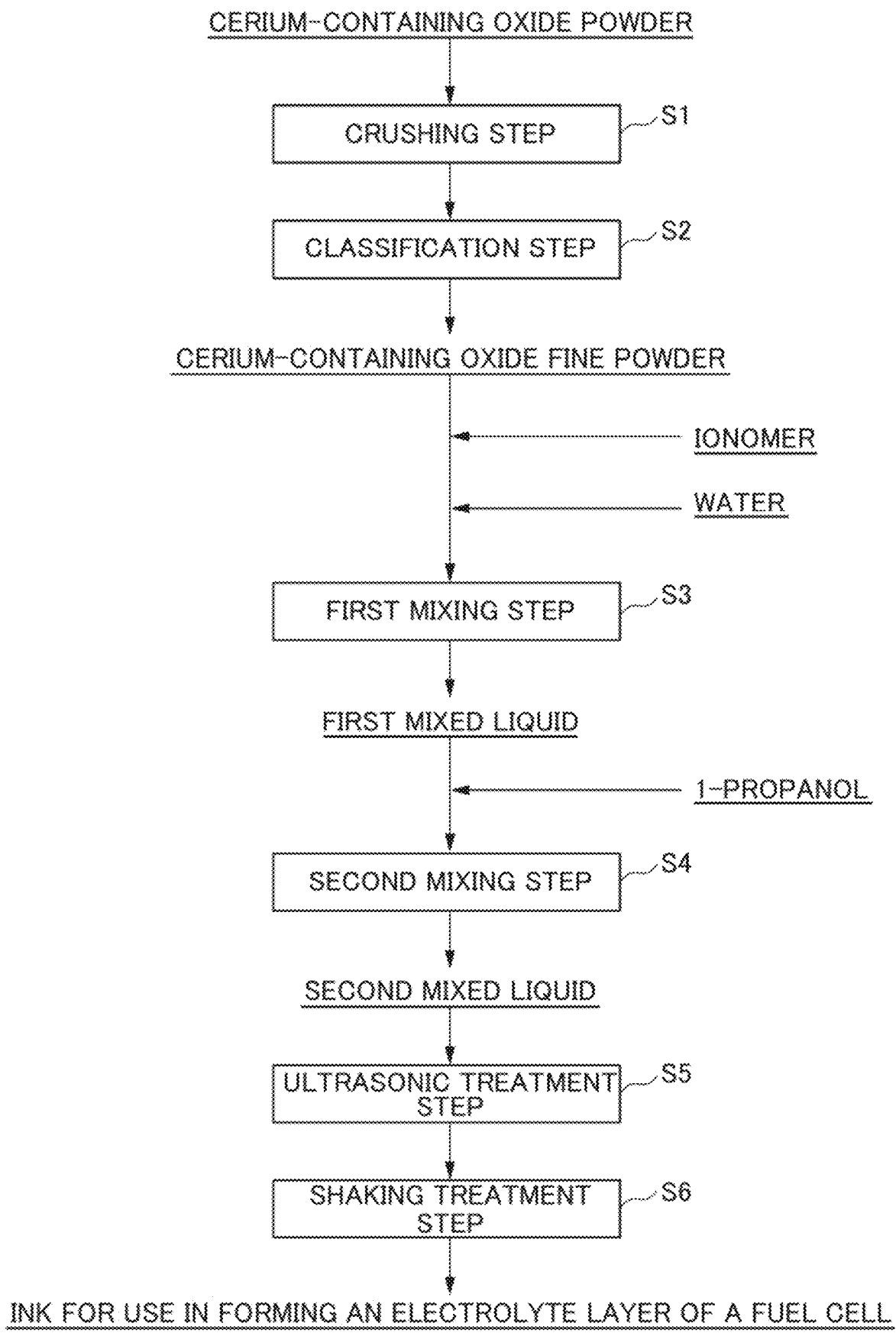

METHOD FOR PRODUCING INK FOR USE IN FORMING ELECTROLYTE LAYER OF FUEL CELL

This application is based on and claims the benefit of priority from Japanese Patent Application No. 2024-005152, filed on 17 Jan. 2024, the content of which is incorporated herein by reference.

BACKGROUND OF THE INVENTION

Field of the Invention

The present invention relates to a method for producing an ink for use in forming an electrolyte layer of a fuel cell.

Related Art

In recent years, fuel cells that contribute to energy efficiency have been researched and developed to ensure that more people have access to affordable, reliable, sustainable, and advanced energy. A fuel cell generally has an electrode structure (MEA) including an anode-side catalyst layer and a cathode-side catalyst layer disposed opposite to each other with an electrolyte layer interposed therebetween. In the fuel cell, hydrogen ions generated in the anode-side catalyst layer and oxygen ions generated in the cathode-side catalyst layer react with each other to generate water. It is known that hydrogen peroxide is generated as a reaction by-product during this reaction. Hydrogen peroxide may cause degradation of the electrolyte layer. Therefore, a hydrogen peroxide remover (radical quencher) is generally added to the electrolyte layer. Cerium compounds are widely used as the hydrogen peroxide remover. As the cerium compound, a water-soluble cerium compound such as cerium nitrate is known. Use of a cerium-containing oxide such as cerium oxide has also been studied (see, for example, Patent Document 1).

Patent Document 1: Japanese Unexamined Patent Application, Publication No. 2020-64721

SUMMARY OF THE INVENTION

In the technology related to the fuel cell, one of the problems is to prolong the life of an electrolyte layer. In order to prolong the life of the electrolyte layer, it is effective to add a radical quencher to the electrolyte layer. Cerium-containing oxides are useful as a radical quencher in electrolyte layers because of their high water-resistance.

As a method of forming an electrolyte layer, there is known a coating and drying method in which an electrolyte layer forming ink is applied to a surface of an anode-side catalyst layer or a cathode-side catalyst layer and dried. The coating and drying method is an effective method in that an electrolyte layer can be continuously formed. However, according to studies by the present inventors, in an ink for use in forming an electrolyte film in which a cerium-containing oxide is dispersed, particles of the cerium-containing oxide easily settle, and it tends to be difficult to stabilize the composition of the ink. Therefore, it is difficult to continuously form an electrolyte layer in which a cerium-containing oxide is uniformly dispersed by the coating and drying method.

The present invention has been made in view of the above circumstances, and an object of the present invention is to provide a method for producing an ink for use in forming an electrolyte layer of a fuel cell, in which although a cerium-containing oxide is contained, particles of the cerium-containing oxide are less likely to settle over a long period of time, and a composition of the ink is stable. This contributes to improvement in energy efficiency.

The present inventors have found that the above problems can be solved by a method including crushing a powder of a cerium-containing oxide to obtain a fine powder, mixing the fine powder with water and an ionomer to obtain a first mixed liquid, mixing and stirring the first mixed liquid and 1-propanol to obtain a second mixed liquid, and then subjecting the second mixed liquid to an ultrasonic treatment, thereby completing the present invention. Accordingly, the present invention provides the following.

A first aspect relates to a method for producing an ink for use in forming an electrolyte layer of a fuel cell, including: a crushing step of crushing a cerium-containing oxide powder to obtain a cerium-containing oxide fine powder; a first mixing step of mixing and stirring the cerium-containing oxide fine powder, an ionomer, and water to obtain a first mixed liquid; a second mixing step of mixing and stirring the first mixed liquid and 1-propanol to obtain a second mixed liquid; and an ultrasonic treatment step of performing an ultrasonic treatment on the second mixed liquid.

According to the method for producing an ink for use in forming an electrolyte layer of a fuel cell of the first aspect, since the powder of the cerium-containing oxide is crushed into a fine powder in the crushing step and the ultrasonic treatment is performed on the second mixed liquid in the ultrasonic step, particles of the cerium-containing oxide in the obtained ink for use in forming an electrolyte layer become fine. Therefore, in the obtained ink for use in forming an electrolyte layer, particles of the cerium-containing oxide are unlikely to settle over a long period of time, and the composition thereof is stabilized.

A second aspect relates to the method for producing an ink for use in forming an electrolyte layer of a fuel cell as described in the first aspect, further including a shaking treatment step of performing a shaking treatment on the second mixed liquid after the ultrasonic treatment step.

According to the method for producing an ink for use in forming an electrolyte layer of a fuel cell of the second aspect, when sedimentation of particles occurs in the second mixed liquid after the ultrasonic treatment, the settled particles are redispersed in the shaking step, so that the composition of the obtained ink for use in forming an electrolyte layer becomes more stable.

A third aspect relates to the method for producing an ink for use in forming an electrolyte layer of a fuel cell as described in the first or second aspect, including a classification step of classifying the cerium-containing oxide fine powder between the crushing step and the first mixing step.

According to the method for producing an ink for use in forming an electrolyte layer of a fuel cell of the third aspect, since coarse particles mixed into the cerium-containing oxide fine powder are removed in the classification step, sedimentation of particles is less likely to occur in the ink for use in forming an electrolyte layer.

A fourth aspect relates to the method for producing an ink for use in forming an electrolyte layer of a fuel cell according to any one of the first to third aspects, in which the second mixed liquid has a content of the cerium-containing oxide fine powder with respect to the ionomer in a range of 0.1 mass % or more and 3.0 mass % or less.

According to the method for producing an ink for use in forming an electrolyte layer of a fuel cell of the fourth aspect, since the content of the cerium-containing oxide is within the above range, by using the obtained ink for use in forming an electrolyte layer, it is possible to form an electrolyte layer which is less likely to be degraded by hydrogen peroxide.

According to the present invention, it is possible to provide a method for producing an ink for use in forming an electrolyte layer of a fuel cell, in which although a cerium-containing oxide is contained, particles of the cerium-containing oxide hardly settle over a long period of time and a composition of the ink is stable.

BRIEF DESCRIPTION OF THE DRAWINGS

FIG. 1 is a flowchart of a method for producing an ink for use in forming an electrolyte layer of a fuel cell according to an embodiment of the present invention.

DETAILED DESCRIPTION OF THE INVENTION

Hereinafter, a method for producing an ink for use in forming an electrolyte layer of a fuel cell according to an embodiment of the present invention will be described with reference to FIG. 1. FIG. 1 is a flowchart of the method for producing an ink for use in forming an electrolyte layer of a fuel cell according to the embodiment of the present invention.

As shown in FIG. 1, the ink for use in forming an electrolyte layer of a fuel cell according to the present embodiment includes a crushing step S1, a classification step S2, a first mixing step S3, a second mixing step S4, an ultrasonic treatment step S5, and a shaking treatment step S6.

The crushing step S1 is a step of crushing a cerium-containing oxide powder to obtain a cerium-containing oxide fine powder. Cerium oxide ($CeO_2$) powder can be used as the cerium-containing oxide powder. The cerium oxide powder may be doped with a transition metal oxide such as zirconium oxide. The cerium-containing oxide powder may be crushed by a wet process or a dry process. As a crushing apparatus, for example, a ball mill, a sand mill, a vibration ball mill, a planetary ball mill, a jet mill, and a mortar and pestle can be used.

The classification step S2 is a step of classifying the cerium-containing oxide fine powder obtained in the crushing step S1 to remove coarse cerium-containing oxide particles. By removing the coarse cerium-containing oxide particles, sedimentation of the particles of the electrolyte layer-forming ink is less likely to occur. The cerium-containing oxide fine powder may be classified in a wet process or in a dry process. As the classifier, for example, a sieve or a wind classifier can be used.

The cerium-containing oxide fine powder after the classification step S2 may be a fine powder that can pass through a sieve having an opening of 32 μm, for example.

The first mixing step S3 is a step of mixing and stirring the cerium-containing oxide fine powder, the ionomer, and water to obtain a first mixed liquid. The order of mixing the cerium-containing oxide fine powder, ionomer, and water is not particularly limited. The cerium-containing oxide fine powder may be mixed with a mixture of the ionomer and water, water may be mixed with a mixture of the cerium-containing oxide fine powder and the ionomer, the ionomer may be mixed with a mixture of the cerium-containing oxide fine powder and water, or the cerium-containing oxide fine powder, the ionomer, and water may be simultaneously mixed. As a stirring device, a magnetic stirrer or a propeller mixer can be used.

The second mixing step S4 is a step of mixing and stirring the first mixed liquid and 1-propanol to obtain a second mixed liquid. By mixing the first mixed liquid and 1-propanol in the second mixing step S4, the ionomer is easily dispersed as compared with the case where the cerium-containing oxide fine powder, the ionomer, water, and 1-propanol are mixed. As the stirring device, a magnetic stirrer or a propeller mixer can be used.

The content of the cerium-containing oxide with respect to the ionomer in the second mixed liquid may be, for example, in a range of 0.1 mass % or more and 3.0 mass % or less. The content of 1-propanol with respect to the ionomer in the second mixed liquid may be, for example, in a range of 40% by mass or more and 80% by mass or less. The content of water with respect to the ionomer in the second mixed liquid may be in a range of, for example, 5 mass % or more and 30 mass % or less.

The ultrasonic treatment step S5 is a step of performing an ultrasonic treatment on the second mixed liquid. Aggregated particles formed in the second mixed liquid are crushed by the ultrasonic treatment, and the cerium-containing oxide becomes primary particles or fine particles close to the primary particles. Therefore, sedimentation of the particles is less likely to occur. As an ultrasonic treatment apparatus, an ultrasonic bath or an ultrasonic homogenizer can be used.

The shaking treatment step S6 is a step of performing a shaking treatment on the second mixed liquid after the ultrasonic treatment. In the second mixed liquid after the ultrasonic treatment, sedimentation of particles occurs in some cases. In such a case, the particles settled by the shaking treatment are redispersed. The shaking treatment may be performed manually or using a shaking machine. The shaking treatment step S6 may be performed immediately before use as an ink for use in forming an electrolyte layer of a fuel cell.

In the second liquid after the shaking treatment, sedimentation of particles hardly occurs even after several hours have elapsed after the shaking treatment, and the stability of composition is high. Therefore, the obtained second liquid can be advantageously used as the ink for use in forming an electrolyte layer of a fuel cell. By using the second liquid as the ink for use in forming an electrolyte layer, the electrolyte layer can be formed continuously for several hours.

According to the method for producing an ink for use in forming an electrolyte layer of the present embodiment having the above-described configuration, it is possible to produce an ink for use in forming an electrolyte layer of a fuel cell in which particles of a cerium-containing oxide hardly settle over a long period of time and which has a stable composition.

Preferred embodiments of the present invention have been described above. However, the present invention is not limited to the above-described embodiment, and can be appropriately modified.

For example, in the present embodiment, the classification step S2 is performed after the crushing step S1, but the classification step S2 may be omitted if the cerium-containing oxide powder has been sufficiently crushed in the crushing step S1. In addition, although the shaking step S6 is performed after the ultrasonic treatment step S5, the shaking step S6 may be omitted if sedimentation of particles is not observed in the second mixed liquid after the ultrasonic treatment.

EXAMPLES

Example 1

As the cerium-containing oxide powder, a $CeO_2$ powder was prepared. The $CeO_2$ powder was crushed using an agate mortar and pestle. Next, the obtained crushed product was classified using a sieve having an opening of 32 µm to obtain a $CeO_2$ fine powder.

An ionomer (118.8 parts by mass) and water (13.3 parts by mass) were mixed to prepare a mixed liquid. To this mixed liquid, 0.14 parts by mass of the $CeO_2$ fine powder was added, and the resulting mixture was mixed using a propeller mixer at a rotation speed of 650 rpm for 15 minutes to obtain a first mixed liquid. Next, 67.9 parts by mass of 1-propanol was added to the first mixed liquid, and the resulting mixture was further mixed using a propeller mixer at a rotation speed of 650 rpm for 15 minutes to obtain a second mixed liquid.

The second mixture was subjected to an ultrasonic treatment for 30 minutes using an ultrasonic bath. In the second mixed liquid after the ultrasonic treatment, a small amount of white particles had slightly settled. Next, the second mixed liquid after the ultrasonic treatment was shaken to disperse the white particles, thereby obtaining a $CeO_2$ dispersion. The obtained $CeO_2$ dispersion was placed in a transparent container and allowed to stand for 3 hours. In the $CeO_2$ dispersion after standing, no sedimentation of white particles was visually observed. Therefore, the $CeO_2$ dispersion liquid could be advantageously used as the ink for use in forming an electrolyte layer of a fuel cell.

Example 2

A $ZrO_2$-doped $CeO_2$ dispersion liquid was obtained in the same manner as in Example 1 except that a $ZrO_2$-doped $CeO_2$ powder was used as the cerium-containing oxide powder and an amount of the $ZrO_2$-doped $CeO_2$ fine powder added to the mixed liquid of the ionomer and water was set to 0.7 parts by mass. The resulting $ZrO_2$-doped $CeO_2$ dispersion was placed in a transparent container and allowed to stand for 3 hours. In the $ZrO_2$-doped $CeO_2$ dispersion after standing, no sedimentation of white particles was visually observed. Therefore, the $ZrO_2$-doped $CeO_2$ dispersion liquid could be advantageously used as the ink for use in forming an electrolyte layer of a fuel cell.

What is claimed is:

1. A method for producing an ink for use in forming an electrolyte layer of a fuel cell, comprising:
    a crushing step of crushing a cerium-containing oxide powder to obtain a cerium-containing oxide fine powder;
    a first mixing step of mixing and stirring the cerium-containing oxide fine powder, an ionomer, and water to obtain a first mixed liquid;
    a second mixing step of mixing and stirring the first mixed liquid and 1-propanol to obtain a second mixed liquid; and
    an ultrasonic treatment step of performing an ultrasonic treatment on the second mixed liquid.

2. The method for producing an ink for use in forming an electrolyte layer of a fuel cell according to claim 1, further comprising:
    a shaking treatment step of performing a shaking treatment on the second mixed liquid after the ultrasonic treatment step.

3. The method for producing an ink for use in forming an electrolyte layer of a fuel cell according to claim 1, further comprising:
    a classification step of classifying the cerium-containing oxide fine powder between the crushing step and the first mixing step.

4. The method for producing an ink for use in forming an electrolyte layer of a fuel cell according to claim 1, wherein:
    the second mixed liquid has a content of the cerium-containing oxide fine powder with respect to the ionomer in a range of 0.1 mass % or more and 3.0 mass % or less.

* * * * *